Sept. 16, 1958     E. W. POTTMEYER     2,851,771
METHOD OF CONSTRUCTING STAYED SPACED WALL MEMBERS
Filed Dec. 26, 1951
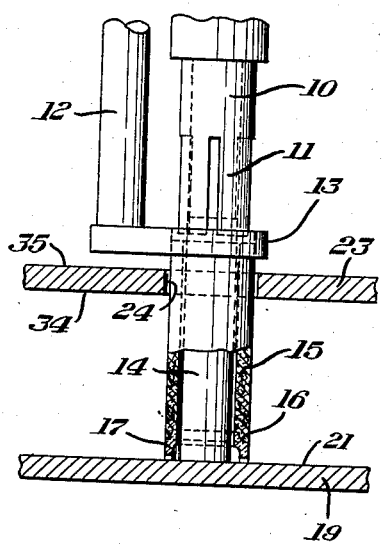
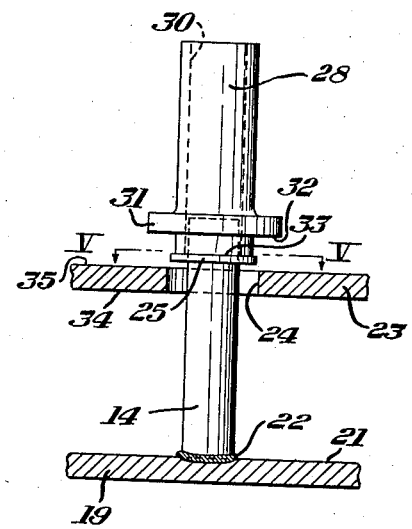
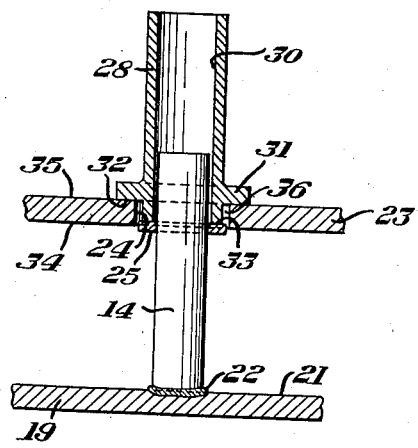
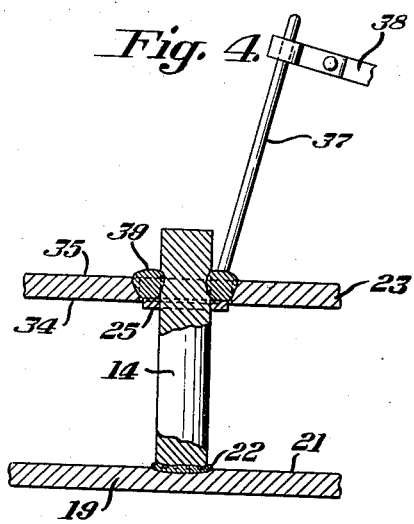
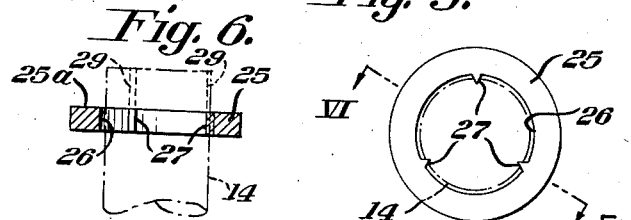
INVENTOR
EDWARD W. POTTMEYER United States Patent Office 2,851,771
Patented Sept. 16, 1958

2,851,771

METHOD OF CONSTRUCTING STAYED SPACED WALL MEMBERS

Edward W. Pottmeyer, Pittsburgh, Pa., assignor by mesne assignments, to Blaw-Knox Company, Pittsburgh, Pa., a corporation of Delaware Application December 26, 1951, Serial No. 263,225

5 Claims. (Cl. 29—471.1)

This invention relates to a new method of staying spaced wall members of metal by welding. More particularly, this invention pertains to such a method and construction in which the stays or studs used are of straight conventional shape and applied with said wall members in their spaced relation, means which are also novel being provided to form a welding recess of satisfactory and stable shape for completion of the welding operation.

The connection of two parallel spaced plates or sheets by stays or studs such as those used, for example, to provide the front and back of water-cooled doors, frames and wall sections for metallurgical furnaces and other uses, has constituted a troublesome and relatively expensive manufacturing problem. There was the need in such staying for fluid-tight joints between the stays and respective plates or sheets and the bond between the stays and the spaced members also had to be rigid as well so as to form an integral structure. Generally such staying was done by means of welding using in many cases special forms of stays and involving relatively elaborate welding methods particularly in the control of the molten metal present at the instant or time of welding. In one earlier practice, rods were welded at one end to one of the plates or sheets, in the pattern selected, by electric or gas welding. The other plate or sheet was then punched with holes in a corresponding pattern to fit over the ends of the short rods and then welded to them in spaced relation to the face plate or sheet. A great deal of trouble arose because in many cases the short rods might be slightly inclined from a position perpendicular to the first plate or sheet or the pattern either of the short rods or of the holes punched in the second plate or sheet might be respectively off in their respectively registry. Hence, in many cases the positions of the holes did not exactly match the position of the short rods and relatively expensive corrective action had to be taken to remedy the situation. In another earlier practice, the plates or sheets were assembled in spaced relation and the welding of the short rods was performed through the holes in the nearer plate having the proper pattern. In that case however, the rods were provided with a special shape having a necked portion adjacent the plate nearer to the welding operator. Thereby, after welding the rods to the farther plate through the holes, the specially shaped stay was broken off at the reduced section or neck and a back-up member placed so as to rest on a reduced portion of each rod to close the hole sufficiently to enable the nearer plate to be welded to the respective rods closing the holes entirely. Such an operation, however, not only required a special shape of stay but also required that the neck of those stays be located at the correct axial position relative to the rod to correspond to the position of the nearer plate. Otherwise, the head of the rod when broken off would leave the remainder thereof either short or too long for the plate spacing desired. If too short, the rods and farther plate had to be discarded and the work begun anew. Moreover, prior to the welding of the nearer plate to the other ends of the rods, the assembly could not be moved or jarred without the risk of changing the position of the back-up members even if they remained loosely on the rods. The loss of the back-up member or an extreme shift in their position would in turn prevent the welding closed of the hole in the nearer plate to the rod extending therethrough.

In the present invention, the foregoing difficulties have been overcome. The stays or studs employed are straight sided and may be readily purchased or cut off to any desired length from standard plain round welding studs. Provision is also made for welding such studs in accordance with this invention through the perforations in the nearer plate or sheet following which a washer is caused to securely engage the studs adjacent their free ends and the said perforations to provide a rigid back-up ring in the respective annular spaces within the openings for the final welding operation. In addition, spacing means are provided to produce the precise depth of annular welding recess between the studs, washers and perforations in question to be readily filled to close the perforations and at the same time provide a specification water tight and integral bond joining the two plates or sheets and the studs rigidly connecting them.

Other objects and advantages will be apparent from the following description and from the drawings, which are illustrative only, in which Figure 1 is a view partly in section of a stud of conventional shape and straight sides about to be welded in accordance with the teaching of this invention to an imperforate plate through a perforation in a perforate plate spaced from said imperforate plate;

Figure 2 is a view similar to the view shown in Figure 1 after the stud welding device has been withdrawn and a washer and spacing tool have been positioned adjacent the free end of the stud;

Figure 3 is a view similar to the view shown in Figure 2 with the tool and washer in section after the washer has been driven into predetermined spaced relation to the perforate plate to provide a stable and predetermined annular welding recess;

Figure 4 is a view similar to that shown in Figure 3 after the tool has been withdrawn and while the aforesaid annular welding recess is being filled with fused metal to complete the staying of the respective plates into a rigid, integral structure, the joints between the ends of the studs and the respective plates being fluid-tight as well;

Figure 5 is a view of one embodiment of a washer conforming to the teaching of this invention taken along line V—V of Figure 2; and Figure 6 is a view of the washer shown in Figure 5 taken along line VI—VI of Figure 5.

Referring to the drawings, a welding machine 10 may be utilized in the practice of this invention. Such a machine may be a stud-welding gun such as shown and described in the American Welding Society's "Welding Handbook," third edition (1950) pages 295 et seq. Such guns include a spring-chuck 11 for holding the stud to be welded and an arm 12 supporting the customary ferrule-holder 13. As is customary in welding stays with these machines, around the stud 14, which is fitted into the chuck 11, a fiber sleeve 15 is placed held at one end in the ferrule-holder and holding at its other end a ferrule 17 usually of porcelain, the function of which is described in the aforesaid "Welding Handbook" at page 300. The sleeve 15 serves to insulate the stud from the outer plate 23 during welding. An annular flange 16 around the lower end of sleeve 15 may fit over the upper edge of ferrule 17. In operation, arm 12 is stationary after the ferrule 17 is brought to rest against the plate 19, and the chuck 11 is advanced or retracted either moving stud 14 toward or into contact with the plate 19, or, retracting the stud 14 a small distance to create an arcing gap between the lower end of stud 14 and the nearer surface 21 of plate 19, following the welding cycle of the stud-welding machine which is automatic when started, until the welding of the stud 14 to the plate 19 is completed, a welding bead-like surface 22 frequently being evident around the base of stud 14. Thereupon gun 10 is removed, the spring-chuck 11 readily releasing from the stud which, now secured to plate 19, extends centrally located through the perforation or opening 24 in the nearer plate 23. Such welding of a stud 14 to a plate 19 is not per se claimed in this invention.

In the combinative teaching of this invention, plate 19 is an imperforate plate as aforesaid and is assembled beforehand in the desired spaced relation, usually parallel, relative to a perforate plate 23. Plate 23 has openings or perforations 24 therethrough in whatever pattern is desired such as those for example, in stayed water-cooled doors for open hearth furnaces. Such perforations 24 have a sufficient diameter to permit the entry therethrough of sleeve 15 and ferrule 17 for the welding of a stud 14 to a plate 19 as illustrated in Figure 1. Upon the removal of gun 10, a washer 25 may be placed on the free end of stud 14. The inner periphery 26 of washer 25 relatively closely corresponds to the diameter of stud 14 welded to plate 19. The washer is harder than the studs and may be hardened by heat treatment after the washers are punched out. Inwardly extending and annularly spaced cutting prongs 27 are provided to cut into the exterior of stud 14 as washer 25 is moved axially by a tool 28 from the position shown in Figure 2, for example, to the position shown in Figure 3. The prongs 27 rout respectively spaced longitudinal grooves 29 along the stud, tightly interlocking the washer and stud with the prongs 27 lodged against the bottoms of the grooves in final position as shown in Figure 3. Shavings cut out by the prongs 27 may curl and adhere to the stud below the prong or may break off and fall away.

As shown in Figures 2 and 3, tool 28 is tubular or otherwise conforms generally insofar as its inner periphery 30 is concerned to the periphery of the studs 14. An annular flange 31 is provided with a lower surface 32 which with the bottom edge 33 of tool 28 provides a gauge for the setting of washer 25. Generally such setting will take place with washer 25 generally about in the plane of the surface 34 of plate 23 which faces surface 21. On the other hand, if plate 23 is a thick plate, the gauge height between surfaces 32 and 33 will bring washer 25 to rest between surface 34 and surface 35 of plate 23. Under any of these circumstances an annular welding recess 36 will be formed which will be sufficient for the structural strength and fluid-tight character desired after the filling in of recess 36 by welding is completed. As shown, it is the abutment of surface 35 by surface 32 which predetermines the extent of the movement of washer 25 along the exterior of the studs 14, with which the washers are in tight frictional engagement, toward the surface 21. Further, the flat form of the edge 33 sets squarely against the flat upper surface 25a of the washers 25 so that the movement of the washers 25 from the free ends of studs 14 toward surface 21 cannot tip or bind but must move at all times parallel to the axis of stud 14 with the plane of said washers perpendicular thereto. In moving tool 28 from the position shown in Figure 2 to the position shown in Figure 3, it may be pressed or driven in a variety of ways.

Each annular recess 36 is formed substantially by the upper surface 25a of the washers 25, the sides of the openings 24 and the periphery of the studs 14 generally outwardly of the surface 25a of the washers 25. The outside diameter of the washers 25 is less than the diameter of the openings 24 but is great enough to extend sufficiently toward the sides of openings 24 to prevent any loss of control of welding metal while in a fused or fluid state in the course of filling recess 36 as shown in Figure 4. Such filling may be done by means of an electric welder of conventional nature such as the one illustrated in which a welding rod 37, which is consumed in operation, is held in an electrode 38 in the hands of the welder. Other welding means may be used, such as gas welding, for filling in the recess 36 to complete a strong structure with the plates 19 and 23 rigidly held together and with the bonds between the respective ends of the studs and the respective plates fluid-tight. Generally, such plates 19 and 23 will be open along at least one side during such staying so that the ferrules 17 may be fractured and spilled out either before or after the washers 25 are positioned and the recesses 36 filled. In such filling as illustrated by the outline 39, the welding operation fuses the said weld metal to the sides of the perforations 24, the studs 14 and the washers 25. Before a final welding operation, such as illustrated in Figure 4, is initiated, the tool 28 is removed.

As a consequence of the teaching of this invention, it will be seen that the studs required do not have to be of any special shape and may be of shorter stock than the specially formed studs heretofore used for stays. The washer is positively secured to the stud in precise position with respect to the openings in the outer plate and remains firmly attached during the final welding. The positioning of the washers and the handling of the tool are such that in achieving the benefits of this invention relatively unskilled labor may be used for those operations. The overall result is faster and less expensive production in a highly competitive and active field.

The invention may be variously practiced within the spirit thereof as defined by the appended claims.

I claim:

1. In combination, in a method of staying spaced members, the steps comprising, assembling an imperforate and a perforate member in spaced relation, welding a stud to said imperforate member through a perforation in said perforate member, said stud extending at least into said perforation, moving a washer in frictional engagement with said stud over the free end thereof and inwardly along the same through said perforation to a position adjacent a part of said perforate member nearer said imperforate member, the said washer being sufficiently harder than said stud and so tightly engaging said stud as to cut into the surface thereof while the washer is moving in said frictional engagement with said stud, and filling said perforation outwardly of said washer with fused metal.

2. In combination, in a method of staying spaced walls, the steps comprising, assembling an imperforate and a perforate wall in spaced relation, welding studs to said imperforate wall through perforations in said perforate wall respectively, said studs extending at least into said perforations in said perforate wall, seating a washer on the free end of each of said studs, moving said washer in frictional engagement with said studs over the free end thereof and inwardly along the same to a position adjacent the surface of said perforate wall facing said imperforate wall, the said washer being sufficiently harder than said stud and so tightly engaging said stud as to cut into the surface thereof while the washer is moving in said frictional engagement with said stud, and weld filling said perforations outwardly of said washers.

3. In combination, in a method of staying spaced walls, the steps comprising, assembling a perforate wall and an imperforate wall in spaced relation, welding straight-sided studs to the surface of said imperforate plate facing said perforate plate, said welding being conducted through respective perforations in said perforate plate, said studs extending from said imperforate plate at least as far as the perforations in said perforate plate, placing a hardened washer over the free end of a plurality of said studs to frictionally engage the exterior thereof, driving said washer along said studs a preselected distance towards said imperforate plate to a position adjacent the plane of the surface of said perforate plate facing said imperforate plate, the fit of the washer on said studs being so tight as to cause said hardened washer to rout seating grooves for the washer in said studs during said driving, and weld filling the annular recess defined by said perforations, said washers and said studs.

4. In combination, in a method of staying spaced walls, the steps comprising, assembling a perforate wall and an imperforate wall in spaced relation, welding straight-sided studs to the surface of said imperforate plate facing said perforate plate, said welding being conducted through respective perforations in said perforate plate, said studs extending from said imperforate plate at least as far as the perforations in said perforate plate, placing a washer over the free end of a plurality of said studs to frictionally engage the exterior thereof, said washers having inwardly extending prongs spaced around the inner periphery thereof, driving said washer along said studs a preselected distance towards said imperforate plate to a position adjacent the plane of the surface of said perforate plate facing said imperforate plate, and weld filling the annular recess defined by said perforations, said washers and said studs.

5. In combination, in a method of staying spaced walls, the steps comprising, assembling a perforate wall and an imperforate wall in spaced relation, welding studs having straight sides to the surface of said imperforate plate facing said perforate plate, said welding being conducted through perforations in said perforate plate, said studs extending from said imperforate plate at least as far as the perforations in said perforate plate, fitting a hardened washer over the free ends of a plurality of said studs to frictionally engage the exterior thereof, moving said washers inwardly with a tool relative to the surface of said perforate wall facing away from said imperforate wall to seat said washers and cause them to rout the surface of the studs forming seats for said washers, and weld filling the annular recess adjacent said last-mentioned surface defined by said perforations, said washers and said studs.

References Cited in the file of this patent

UNITED STATES PATENTS

| | | |
|---|---|---|
| 1,787,580 | Jasper | Jan. 6, 1931 |
| 1,873,905 | Pollei | Aug. 23, 1932 |
| 1,883,897 | Giles | Oct. 25, 1932 |
| 1,954,581 | Wortmann | Apr. 10, 1934 |
| 2,015,193 | Reed | Sept. 24, 1935 |
| 2,134,705 | Crecca | Nov. 1, 1938 |
| 2,199,586 | Bowser | May 7, 1940 |
| 2,347,411 | Hefler | Apr. 25, 1944 |
| 2,568,584 | Hartman | Sept. 18, 1951 |

FOREIGN PATENTS

| | | |
|---|---|---|
| 485,743 | Germany | Nov. 6, 1929 |

OTHER REFERENCES

American Welding Society's, "Welding Handbook," third edition (1950), pp. 295 et seq.